No. 744,268. PATENTED NOV. 17, 1903.
P. E. WELTON.
GLASS BEVELING MACHINE.
APPLICATION FILED MAY 23, 1902. RENEWED APR. 18, 1903.
NO MODEL. 4 SHEETS—SHEET 3.
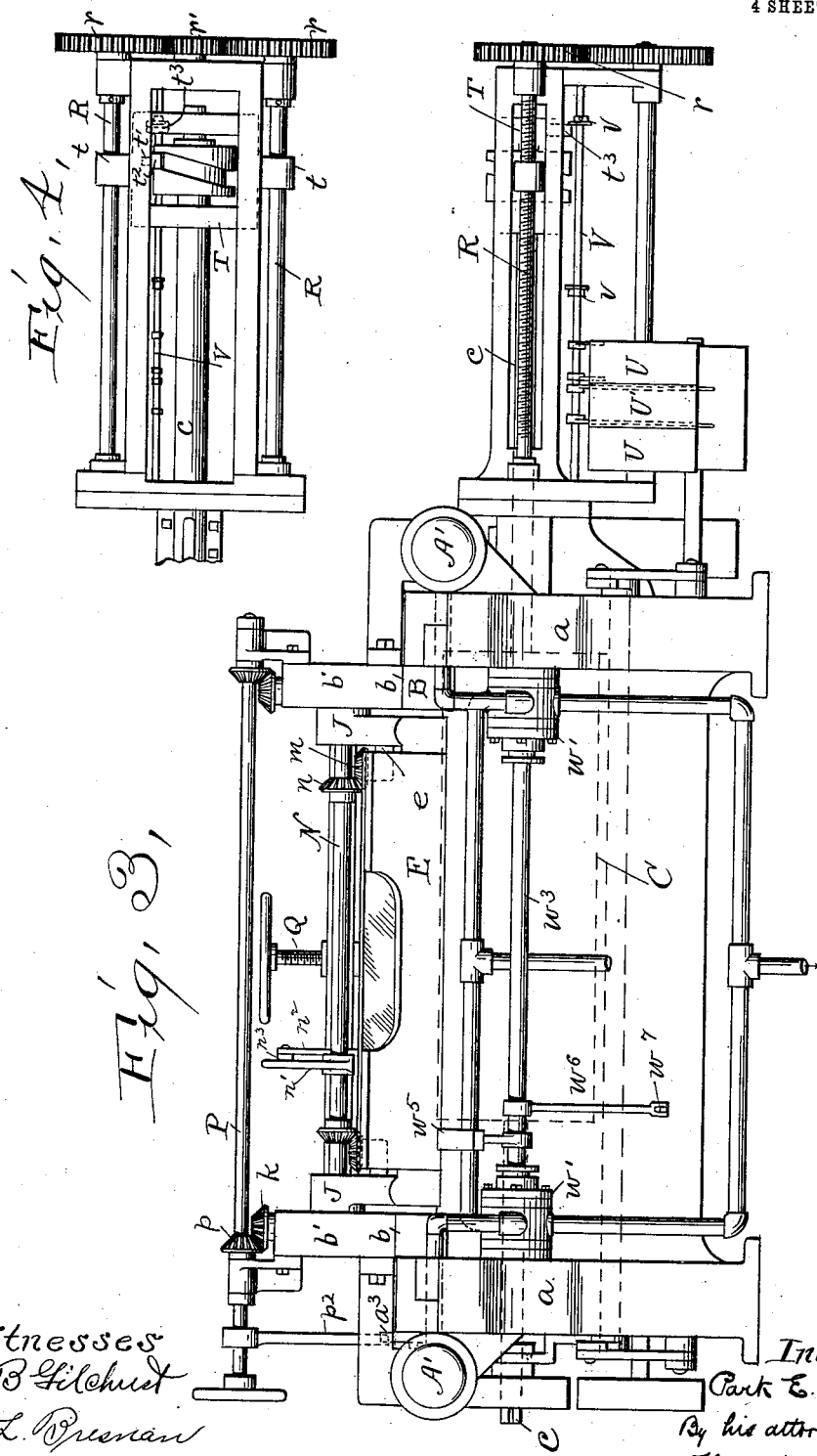

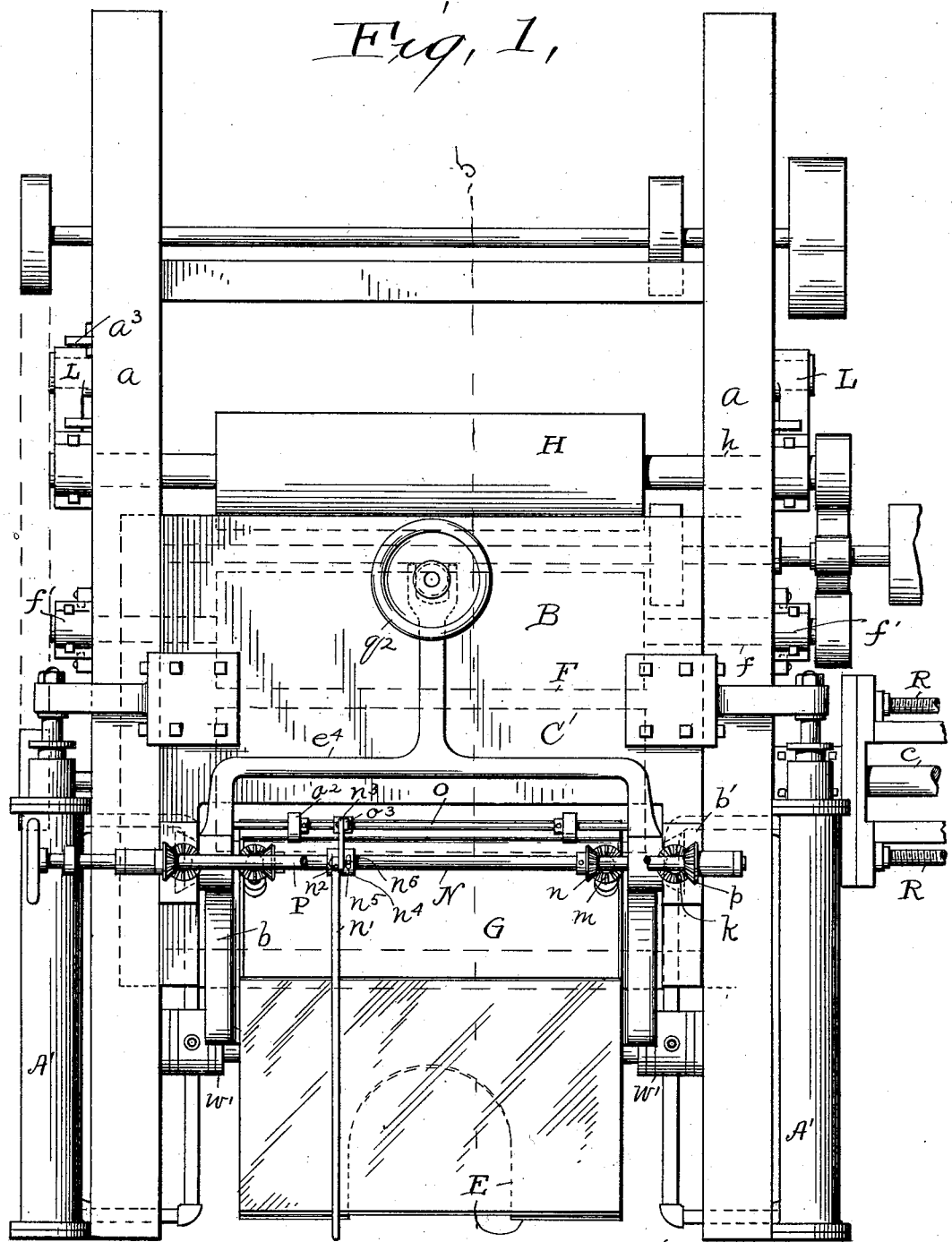

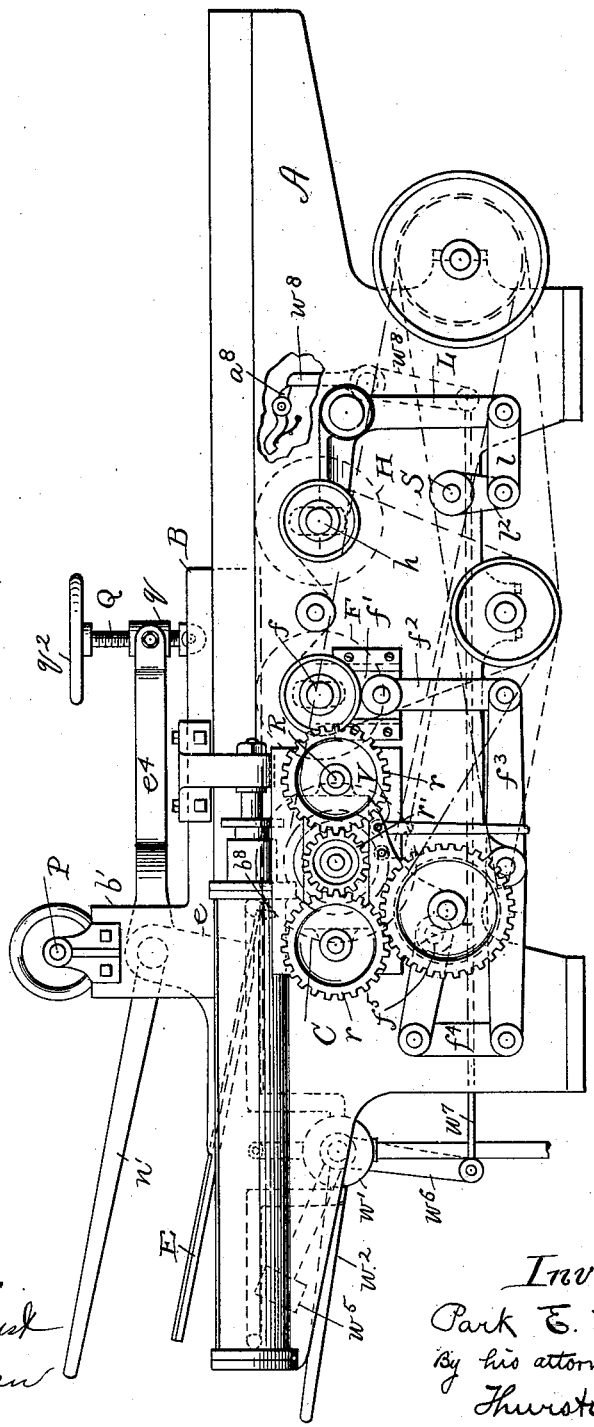

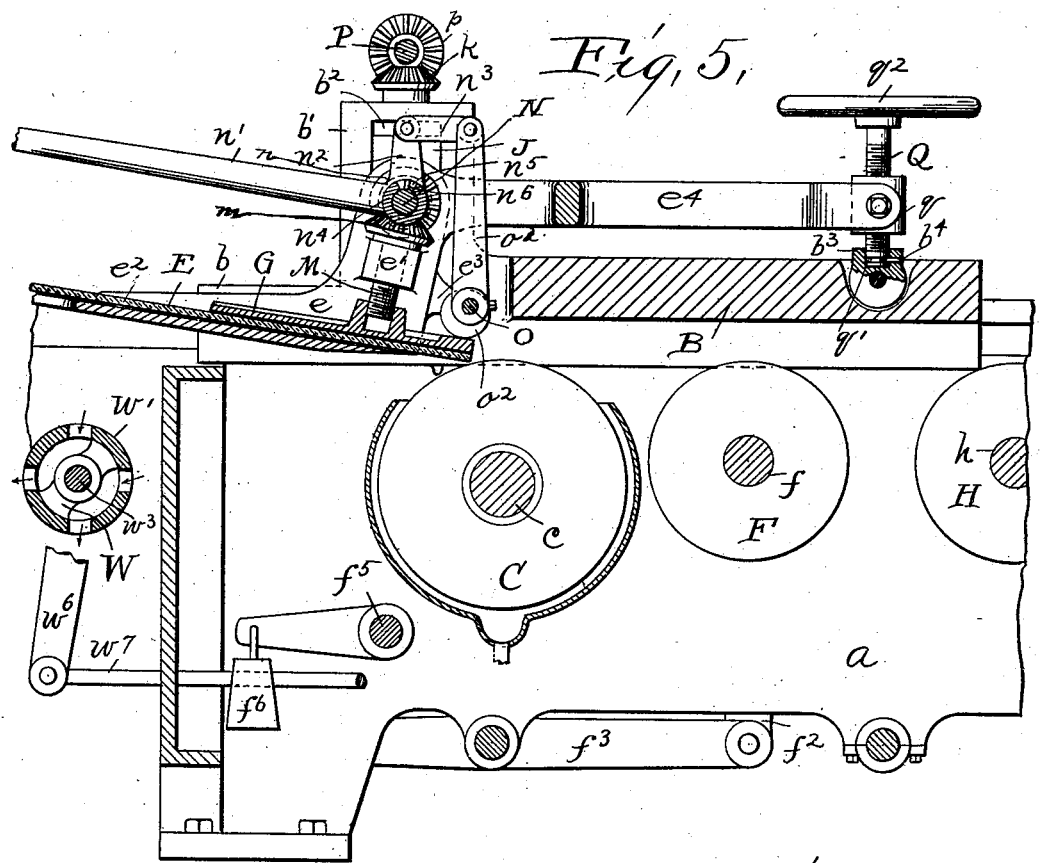
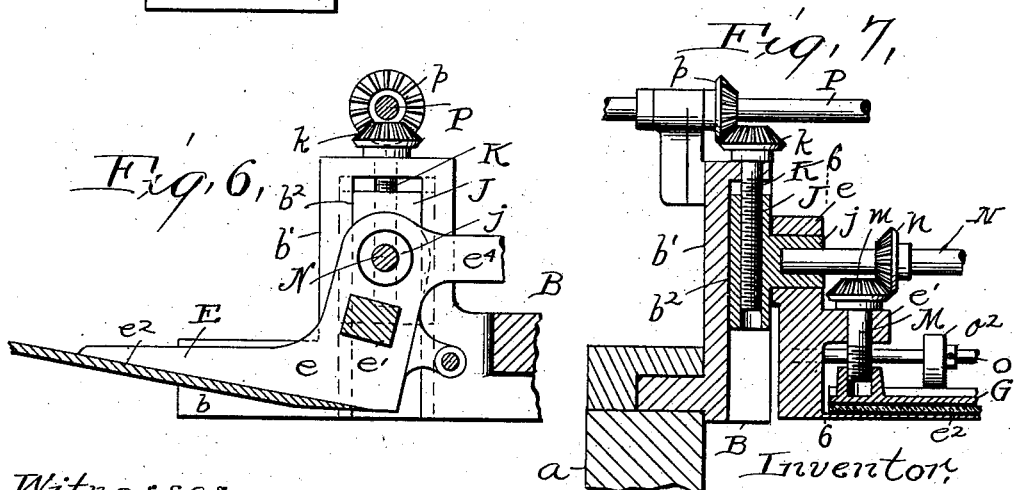

No. 744,268. Patented November 17, 1903.

UNITED STATES PATENT OFFICE.

PARK E. WELTON, OF AKRON, OHIO, ASSIGNOR TO THE ACME GLASS MACHINE COMPANY, OF AKRON, OHIO, A CORPORATION OF DELAWARE.

GLASS-BEVELING MACHINE.

SPECIFICATION forming part of Letters Patent No. 744,268, dated November 17, 1903.

Application filed May 23, 1902. Renewed April 18, 1903. Serial No. 153,338. (No model.)

*To all whom it may concern:*

Be it known that I, PARK E. WELTON, a citizen of the United States, residing at Akron, in the county of Summit and State of Ohio, have invented a certain new and useful Improvement in Glass-Beveling Machines, of which the following is a full, clear, and exact description, reference being had to the accompanying drawings.

The object of the invention is to provide a machine in which plates of glass of any size within the machine's capacity may have their edges rapidly beveled at any angle and said beveled edges nicely finished.

The invention relates to the means for holding the glass plate in proper position for the attainment of the desired result, to the means for advancing and returning the carriage, to the means for automatically lifting the finished glass above the plane of the grinding-surface during the return of the movable carriage, to the means for preventing the glass from bending or chattering while it is being ground, to the means for preventing the grooving of the grinding-surfaces or for unevenly wearing such surfaces by narrow plates and otherwise, and generally to the construction and combination of parts constituting the machine, as shown in the drawings and hereinafter explained, all of which will be pointed out definitely in the claims.

In the drawings, Figure 1 is a plan view of the machine. Fig. 2 is a side elevation thereof. Fig. 3 is an end view. Fig. 4 is a plan view of a part of the machine which does not fully appear in Fig. 1. Fig. 5 is a longitudinal vertical sectional view of the plane indicated by line 5 5 of Fig. 1. Fig. 6 is a vertical sectional view through the movable carriage and tilting-plate holder supported thereon in the plane indicated by line 6 6 of Fig. 7. Fig. 7 is a transverse vertical section view of the mechanism shown in Fig. 6.

Upon the tops of the side members $a\ a$ of the machine-frame are ways in which a carriage B slides longitudinally. Below the carriage the grinding and finishing cylinders C, F, and H are mounted on transverse horizontal axes. There are three of these cylinders in the machine as constructed; but any desired number may be employed. The cylinder C is a rough grinder and is preferably made of emery or some analogous material. The cylinder F is a smoothing-cylinder, and the cylinder H is a polishing and finishing cylinder, the two latter cylinders being made of suitable material—such, for example, as is ordinarily used for analogous purposes. These cylinders are respectively secured to the driven shafts $c, f,$ and $h$, which are mounted and driven as hereinafter set forth.

The carriage B has the middle part of its front edge cut away or, perhaps more accurately, the front end of the carriage is composed of only two side bars $b$, so that the glass-holder E may project below the carriage and hold the glass in proper relation to the grinding and polishing cylinders. On each of these side bars is a vertical standard $b'$. In the inner faces of these standards are vertical grooves $b^2$, which accommodate the vertically-movable blocks J, which are supported and adjusted up and down by the screws K, which pass through the tops of the standards and screw into the blocks. Each block has on its inner face a horizontal cylindrical stud $j$, from which the glass-holder E is pivotally suspended by means of its two upwardly-extended arms $e\ e$, into which said studs project. The bed-plate $e^2$ of the glass-holder extends across the machine, being of such width that it may pass through the table between the side bars $b\ b$. Its top surface is fitted to the glass plate which is to be beveled, being flat in case the glass is flat. A clamping-plate G lies over this bed-plate, where it is held and moved up and down by screws M, which pass down through short inwardly-extended brackets $e'$ on the arms $e$ and screw into said clamping-plate. The clamping-plate overhangs the rear beveled edge of the bed-plate $e^2$, and therefore it bears upon the glass-plate, which it clamps to said bed-plate directly over the part of said plate which is being beveled, which glass plate also necessarily overhangs the rear edge of the bed-plate of the glass-holder. A beveled gear $m$ is attached to the upper end of each of the screws M, and these two beveled gears mesh with other beveled gears $n$, secured to a transverse shaft N, which is axially mounted in the studs $j$. By the turning of this shaft, therefore, both sides of the glass-holder move simultaneously up or down, as the case may be. To this shaft N a forwardly-projecting lever $n'$ is attached, whereby it may be turned by the operator. There is also attached to the same shaft another arm $n^2$, which is connected by a link $n^3$ with an upwardly-extended arm $o'$, secured to a transverse shaft O, which is mounted in brackets $e^3$, projecting rearward from the arms $e$. The operating-lever $n'$ and the arm $n^2$ are not attached immovably to the shaft N, but are both connected with a sleeve $n^4$, embracing such shaft and having a short segmental slot $n^5$, into which projects a pin $n^6$, which is attached to the shaft. Therefore the operating-lever $n'$ may be moved a short distance before it begins to turn the screws M, by which the clamping-plate is moved up or down. On the shaft O a number of cams $o^2$ are secured, and the shaft O is so placed and these cams are of such size that when the glass plate is being clamped upon the bed of the glass-holder these cams will bear upon the top surface of the clamping-plate near the rear edge thereof and directly over the edge of the glass plate which is being beveled. This glass is thus held firmly against the grinding-cylinders and is prevented from being bent or broken during the grinding operation. An operating-arm $e^4$, which is forked at its front end, is secured to the arms $e\ e$, by which the glass-holder is suspended, and this operating-arm is also forked at its rear end, and this fork embraces and is pivotally connected to a nut $q$ upon a screw Q, whose lower end is rotatably seated in a block $b^3$, pivoted on a transverse horizontal axis to the carriage. A pin $b^4$, secured to this block, enters a circumferential groove $q'$ in this screw, and thereby prevents its withdrawal from the block, while permitting it to rotate therein. This screw has a hand-wheel $q^2$ on its upper end, by which it may be turned to cause the nut to move up or down upon it, with the result of changing the angle of inclination of the glass-holder. The screws K have at their upper ends beveled gears $k$, which mesh with two beveled gears $p$, secured to a transverse shaft P, mounted in brackets secured to the vertical standards $b'$. This shaft has a hand-wheel on one end, by which it may be turned to raise or lower the blocks J, from which the glass-holder is suspended. Attached to this same shaft P is a trip-arm $p^2$. When the carriage is moved rearward by the mechanism provided for that purpose, the glass plate, firmly held in the proper angular position, is first moved across the grinding-cylinder C, by which it is ground, then across the other two cylinders, by which the beveled edge of the glass is finished and polished. Very soon after this is accomplished this trip-arm $p^2$ strikes a lug or projection $a^3$ on the machine-frame, whereby the shaft P is turned enough to raise the blocks J, and thereby raise the glass-plate holder and the glass so that in the return motion of the carriage the glass cannot possibly touch the grinding-surfaces. When the carriage has returned to its starting-point, it is stopped, as by stopping the machine. The operator then by moving the arm $n'$ releases the glass both from the clamping-plate and the cams $o^2$, wherefore the glass may be moved and another put in its place.

The shaft $c$ of the grinding-cylinder C is longitudinally movable in its bearings. It is driven by a belt passing over a pulley splined to the shaft, but held in fixed relationship to the other pulley over which this belt passes. This shaft projects through the journal-box at one side of the machine, and to it is secured a disk having a cam-groove in its periphery. Embracing the shaft and slidable upon it is a frame T, having laterally-extended arms $t$, through which are longitudinal threaded holes. A stud $t'$, on which a roller $t^2$ is mounted, is secured to one side of this frame and projects into the cam-groove in the disk. When, therefore, the shaft and disk are rotated, it is compelled to vibrate endwise during each revolution a distance equal to the pitch of the cam-groove—that is, providing corresponding endwise movement of the frame is prevented. This is prevented; but the frame is given a slow movement first in one direction and then in the other by means of two rotating feed-screws R, mounted in and passing through the threaded holes in the arms $t$. Attached to each of these feed-screws is a gear $r$ and between them an idler-pinion $r'$, by which they are compelled to rotate simultaneously. From the described construction it is evident that as this grinding-cylinder is rotated it is slowly moved bodily endwise, and it is also given a rapid vibratory motion in the same direction. This prevents the formation of any groove in the face of the grinding-cylinder when the plate being beveled thereby is not as wide as the grinding-surface. The two other cylinders are mounted in bearings which are vertically movable. The smoothing-cylinder F is secured to a shaft which is mounted in vertical movable boxes $f'$, and each of these boxes has pivoted to it a depending link $f^2$, whose lower end is secured to one end of a pivoted lever $f^3$. The other end of each of these pivoted levers is connected by a link $f^4$ with a crank-arm secured to a rock-shaft $f^5$, which rock-shaft is under the influence of a weight $f^6$ or some equivalent mechanism tending to rock it in that direction which through the described train of mechanism will force up the boxes in which this smoothing-cylinder is journaled. This cylinder is therefore yieldingly pressed against the beveled edge of the glass. The polishing-cylinder H is also vertically movable; but it is secured to a shaft which is rotatably mounted in boxes secured to the horizontal arms of bell-crank levers L, which are pivoted to the side frame members. The lower arms of these levers L are connected by links $l$ with crank-arms $l^2$, secured to a rock-shaft S, which is under the influence of a weight or its equivalent to move it in that direction which through the described train of mechanism will cause the upward movement of said polishing-cylinder. Therefore this cylinder is also yieldingly pressed against the beveled edge of the glass. Both of the last two named cylinders are driven by a suitable belt passing over a pulley on the shaft, over the pulleys on the end of the two cylinder-shafts, and under an idler-pulley.

The two feed-screws referred to are driven from a shaft whereon are two pulleys U, secured to it, and between them a loose pulley U'. Two belts from a pulley on the shaft, one of them being a cross-belt, engages with two of these pulleys—with the loose pulley and one of the fast pulleys. A longitudinally-movable shifter-rod V is provided with arms embracing these two belts, wherefore by the lengthwise movement of the shifter-rod the belts are shifted. Attached to these shifter-rods are two adjustable tappets $v$, between which lies an arm $t^3$, attached to the frame. When this frame has moved as far as desired in one direction, this arm hits one of the tappets and shifts the belts, wherefore the feed-screws reverse their motion, and the shaft of the grinding-machine begins to move in the opposite direction until the arm on the frame hits the other tappet and reverses the position of the belt.

The carriage-moving mechanism shown consists of steam-cylinders A', which are fixed to the machine-frame, and the piston-rods are connected with the carriage. Steam is admitted to these cylinders through a valve-casing $w'$, in which is a valve W, which by its position determines whether the steam shall be admitted to one end or the other of said cylinder. The valve W is of ordinary construction and may be turned by its operating-arm $w^2$, attached to the valve-stem $w^3$, and on which a weight $w^5$ is hung. Secured also to the stem is a depending arm $w^6$, which is connected by a longitudinal link $w^7$ with the lower end of the lever $w^8$, the other end of which lever is held by a latch $a^8$ in one of its two possible positions. This latch is so placed with respect to the carriage that when the carriage moves in one direction a boss $b^8$ on the carriage strikes this latch and releases the lever, whereupon a weighted arm $w^2$, secured to the valve-stem $w^3$, turns said stem and the valve into a position where steam will be admitted to the opposite end of the cylinder, with the result that the carriage travels in the return direction.

Having described my invention, I claim—

1. In a glass-beveling machine, the combination of a longitudinally-movable carriage, a rotatable grinding-cylinder mounted on a transverse axis, a glass-holder hung in said carriage upon a parallel transverse axis whereby it may be rocked upon the same, means for clamping the glass plate to said holder, and means for rocking the glass-holder to and holding it in any desired position, for the purpose specified.

2. In a glass-beveling machine, the combination of a longitudinally-movable carriage, and a grinding-cylinder rotatable upon a transverse axis, with a plate-holder suspended from said carriage upon a parallel transverse axis, an operating-arm rigid with said glass-holder, and means for moving and holding the said arm in various positions relative to the carriage whereby to adjust the angular position of said glass-holder, and means for clamping a glass plate to said glass-holder, for the purpose specified.

3. In a glass-beveling machine, the combination of a longitudinally-movable carriage and a grinding-cylinder rotatable upon a transverse axis, with a glass-holder hung in said carriage upon a parallel transverse axis, an operating-arm rigid with said glass-holder, a block pivoted on a transverse axis to said carriage, a screw rotatable in said block, a nut upon said screw, and pivotal connections between said operating-arm and nut, for the purpose specified.

4. In a glass-beveling machine, the combination of a longitudinally-movable carriage, a grinding-cylinder rotatably mounted below the carriage on a transverse axis, vertically-adjustable blocks supported upon said carriage, a glass-holder hung from said blocks on a transverse axis and projecting below the carriage, means for clamping the glass plate upon said glass-holder, and means for rocking said holder in any angular position, for the purpose specified.

5. In a glass-beveling machine, the combination of a longitudinally-movable carriage, a grinding-cylinder below the carriage and rotatable upon a transverse axis, a glass-holder suspended from said carriage and projecting below it, a clamping-plate overhanging one edge of said glass-holder, and means bearing upon the upper side of said overhanging edge of the clamping-plate to prevent the same from springing, for the purpose specified.

6. In a glass-beveling machine, the combination of a longitudinally-movable carriage, a grinding-cylinder below the carriage and rotatable upon a transverse axis, a glass-holder suspended from said carriage and projecting below it, a clamping-plate overhanging one edge of said glass-holder, a transverse shaft mounted in the glass-holder above the overhanging edge of said front plate, cams secured to said shaft, and means for operating the shaft to cause said cams to bear upon the overhanging edge of said clamping-plate, for the purpose specified.

7. In a glass-beveling machine, the combination of a longitudinally-movable carriage whose front end is composed of two side bars, standards rising from said side bars, vertically-adjustable blocks mounted in said standards, a glass-holder suspended from said blocks on a transverse axis and extending below the carriage, a clamping-plate and a grinding-cylinder below the carriage rotatable upon a transverse axis, for the purpose specified.

8. In a glass-beveling machine, the combination of a longitudinally-movable carriage, a grinding-cylinder located below the same and rotatable upon a transverse axis, a glass-holder suspended from said carriage, and projecting below the same, a clamping-plate, screws rotatably supported by said glass-holder and screwing into the clamping-plate, beveled gears upon said screws, a transverse shaft mounted in the glass-holder and having beveled gears which mesh with the beveled gears on the screws, and an operating-handle for turning said shaft, for the purpose specified.

9. In a glass-beveling machine, the combination of a longitudinally-movable carriage, a grinding-cylinder located below the same, and rotatable upon a transverse axis, a glass-holder suspended from said carriage and projecting below the same, a clamping-plate, screws rotatably supported by said glass-holder, and screwing into the clamping-plate, beveled gears on the screws, a collar embracing and having a limited movement only to said shaft, an operating-handle secured to said collar, a transverse shaft mounted in the glass-holder, cams secured thereto, an operating-arm secured to said shaft, a second operating-arm secured to the sleeve referred to, and a link connecting the last-named two operating-arms, for the purpose specified.

10. In a glass-beveling machine, the combination of a carriage having its front end formed of two side bars, standards rising from said side bars, blocks vertically movable upon said standards and each having an inwardly-extended cylindrical stud, means for raising and lowering said blocks, a glass-holder having upwardly-extended side arms which are pivotally hung upon said studs, a clamping-plate, two screws rotatably mounted in brackets projecting from the inner faces of said arms, and which screw into said clamping-plate, a transverse shaft mounted in said studs, and intermeshing beveled gears to said shaft and said screws, and a grinding-cylinder below the carriage and rotatable on a transverse axis, for the purpose specified.

11. In a glass-beveling machine, the combination of a longitudinally-movable carriage a grinding-cylinder located below the same and rotatable upon a transverse axis, a vertically-movable glass-holder pivotally hung from said carriage and projecting below the same, means for rocking said holder in various angular positions, a clamping-plate, its operating mechanism, and means for raising the glass-holder as the carriage nears the end of its forward movement, for the purpose specified.

12. In a glass-beveling-machine, the combination of a longitudinally-movable carriage, a glass-holder suspended therefrom, means for adjusting said holder into various angular positions, and a clamping-plate with a grinding-cylinder mounted on a transverse axis, and one or more finishing-cylinders mounted on transverse axes, and yieldingly pressed upward against the edge of the glass plate, for the purpose specified.

13. In a glass-beveling machine, the combination of a longitudinally-movable carriage, and a glass-holder suspended therefrom, and means for adjustably fixing the angular position of said holder with a grinding-cylinder rotatable upon a transverse axis, and means for imparting to said cylinder a vibratory motion in the direction of its axis of rotation, for the purpose specified.

14. In a glass-beveling machine, the combination of a longitudinally-movable carriage, and a glass-holder suspended therefrom, and means for adjustably fixing the angular position of said holder with a grinding-cylinder rotatable upon a transverse axis, and means for imparting to said cylinder a vibratory motion in the direction of its axis of rotation, and means for slowly moving said cylinder backward and forward, in the direction of its axis while it is rotating and vibrating, for the purpose specified.

15. In a glass-beveling machine, the combination of a longitudinally-movable carriage, and a glass-holder pivotally hung therefrom, and means for adjustably fixing the angular position of said holder with a grinding-cylinder rotatable upon a transverse axis, and means for moving said cylinder slowly backward and forward lengthwise of its axis while the same is rotating, for the purpose specified.

16. In a glass-beveling machine, the combination of a longitudinally-movable carriage, a glass-holder pivotally hung therefrom, and means for adjusting the same into various angular positions, with a grinding-cylinder, a transverse shaft upon which the cylinder is secured, which shaft is movable lengthwise in its bearings, a disk secured to said shaft having a cam-groove in its periphery, and a fixed stud entering said groove, for the purpose specified.

17. In a glass-beveling machine, the combination of a longitudinally-movable carriage, a glass-holder pivotally hung therefrom, and means for adjusting the same into various angular positions, with a grinding-cylinder, a transverse shaft upon which the cylinder is secured, which shaft is movable lengthwise in its bearings, a disk secured to said shaft having a cam-groove in its periphery, a frame slidable in a path parallel to said shaft, a stud secured to said frame entering said cam-groove, and means for slowly moving said frame first in one direction and then in the other while the shaft is rotating, for the purpose specified.

18. In a glass-beveling machine, the combination of a longitudinally-movable carriage, a glass-holder suspended therefrom, and means for adjusting the same into various angular positions, with a grinding-cylinder, a transverse shaft upon which the cylinder is secured, which shaft is movable lengthwise in its bearings, a disk secured to said shaft having a cam-groove in its periphery, a frame slidable in a path parallel to said shaft, a stud secured to said frame entering said cam-groove, a feed-screw, a nut secured to the carriage and operating upon said feed-screw, and means for rotating said feed-screw first in one direction and then in the other, for the purpose specified.

19. In a glass-beveling machine, the combination of a longitudinally-movable carriage, a glass-holder suspended therefrom, and a grinding-cylinder rotatable upon a transverse axis, with steam-cylinders fixed in position on opposite sides of said carriage, their pistons and piston-rods secured to the carriage, a valve mechanism whereby to admit steam to either end of the cylinders, a weight for turning said valve, a latch for holding the weight out of action, and a tripping device on the carriage for tripping said latch, for the purpose specified.

In testimony whereof I hereunto affix my signature in the presence of two witnesses.

PARK E. WELTON.

Witnesses:
E. B. GILCHRIST,
E. L. THURSTON.